No. 690,807. Patented Jan. 7, 1902.
G. T. WOODS.
METHOD OF CONTROLLING ELECTRIC MOTORS OR OTHER ELECTRICAL TRANSLATING DEVICES.
(Application filed Aug. 27, 1892.)
(No Model.)
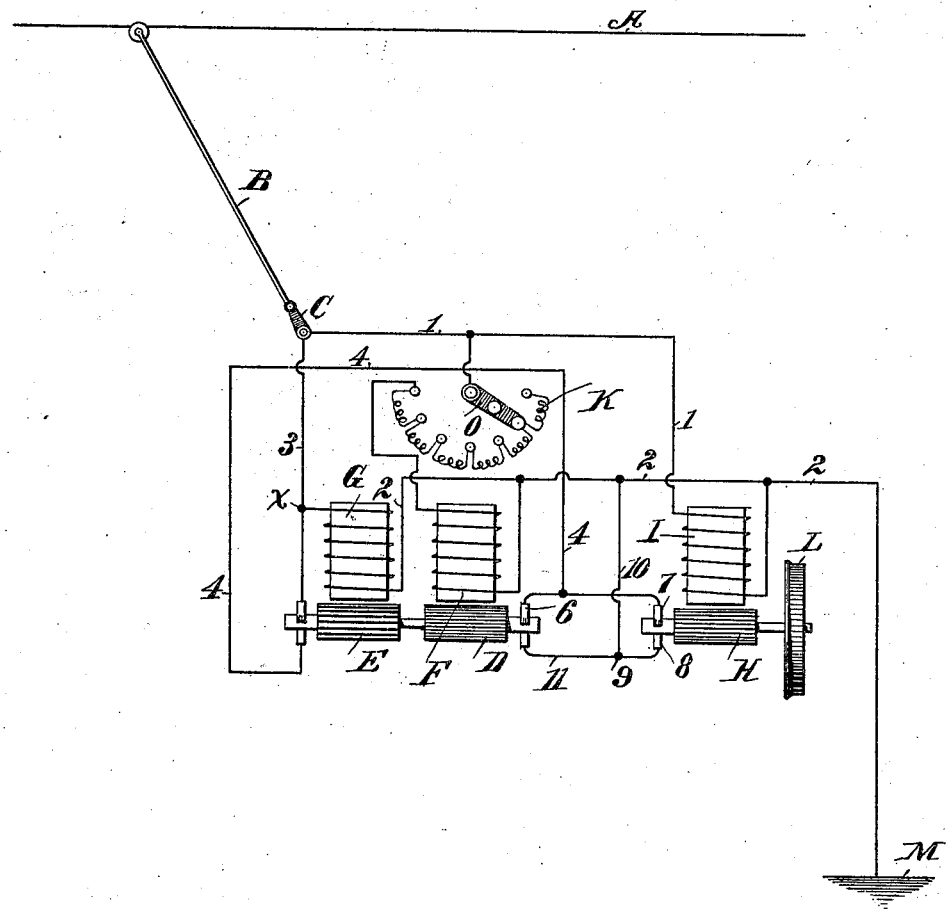
Witnesses
Wm H. Courtland
M. J. Kelley.
Inventor
Granville T. Woods,
by his Attorneys
Baldwin, Davidson & Wight

United States Patent Office.

GRANVILLE T. WOODS, OF PARKRIDGE, NEW JERSEY, ASSIGNOR, BY MESNE ASSIGNMENTS, TO HARRY WARD LEONARD, OF EAST ORANGE, NEW JERSEY.

METHOD OF CONTROLLING ELECTRIC MOTORS OR OTHER ELECTRICAL TRANSLATING DEVICES.

SPECIFICATION forming part of Letters Patent No. 690,807, dated January 7, 1902.

Application filed August 27, 1892. Serial No. 444,268. (No model.)

*To all whom it may concern:*

Be it known that I, GRANVILLE T. WOODS, a citizen of the United States, residing at Parkridge, in the county of Bergen and State of New Jersey, (formerly residing at New York city, in the county and State of New York,) have invented certain new and useful Improvements in the Method of Controlling Electric Motors or other Electrical Translating Devices, of which the following is a specification.

The object of my invention is to provide for the efficient and economic regulation of electric motors or other translating devices without employing regulating resistances in the manner in which they are now used.

The invention consists, first, in an improved method of controlling electric motors by generating exterior to the motor to be governed an electromotive force counter to the current supplied to the motor from the main source and varying such counter electromotive force to control the supply of current from the main source to the motor; second, the above method of operation supplemented by the further step of supplying to the motor to be governed an auxiliary current generated by means of the energy employed in developing said counter electromotive force, and, third, an improved organization of apparatus for carrying out the invention.

The accompanying drawing is a diagram illustrating my invention in a simple and efficient form.

The invention is shown applied to a trolley system of electrical propulsion.

A indicates the conductor upon which the trolley B runs, and M indicates the other side of the circuit, in this instance shown as the earth.

C indicates a switch by which the circuit connection between the apparatus and the conductor A may be opened and closed at pleasure. Current from the main circuit passes by wire 1 around the field-magnet core I of the motor to be regulated, thence by wire 2 to earth. H is the armature of this motor and is fast on or otherwise geared or connected to the axle to be driven, L being one of the drive or carrying wheels, mounted on the axle. Current also passes by wire 3 through the coil or coils of the field-magnet G of an auxiliary motor, of which E is the armature, and thence by wire 2 to earth. Current also passes from the conductor A through the switch O, movable over a series of resistances K, through the coil or coils of the field-magnet F of a dynamo electric generator, of which D is the armature, and thence by wire 2 to earth. The wire 3 is connected from a point X, between the conductor A and the coil of the field-magnet G, with one brush of the armature E of said magnet, the other brush of which is connected by wire 4 with a brush 6 of the generator F D and a brush 7 of the motor I H to be controlled. The other brush 8 of said motor is connected by wire 11 with the remaining brush of the generator, and the two last-named brushes are connected from the point 9 by wires 10 and 2 to earth.

The operation of this apparatus is as follows: The fields of the main motor, the auxiliary motor, and the generator are energized by the current passing in the connections described, and the amount of current passing to the field-coil of the generator may be regulated by the manipulation of the switch O. The current from the conductor A reaches the armature H of the main motor after having traversed the armature of the auxiliary motor—in other words, these armatures are in series. The current developed in the armature of the generator also traverses the armature of the main motor, these two armatures also being in series. The apparatus will be running with the least expenditure of energy when the greatest resistance at O K is included in the circuit of the generator-field. As this resistance is cut down more current traverses said field and its magnetization is increased, or, in other words, the number of lines of force is increased. This requires more work from the auxiliary motor G E, and as a consequence its speed is reduced, the counter electromotive force in its armature-coils falls, and more current passes from the point X through the armature E, and consequently through wire 4 and armature H to earth. At the same time the current developed in the armature of the generator F D is increased, and this current also traverses the armature H. The generator is so wound and constructed as to develop a current of a higher electromotive force than the main current taken from the conductor A.

The armature E is wound with a coarse wire to allow a large volume of current to pass through it without heating.

By this apparatus and method of operation I am enabled to dispense with ordinary resistance-regulators which absorb a large amount of power and are for other reasons objectionable.

The particular organization illustrated may of course be varied and the invention embodied in other forms of apparatus without departing from the principles thereof.

I do not claim herein the combination of apparatus and circuit connections employed in carrying out the method of my invention, since those features are made the subject of a divisional application filed the 28th day of March, 1901, Serial No. 53,212.

Having now described my invention, what I claim as new, and desire to secure by Letters Patent, is as follows:

1. The method of controlling electric motors which consists in supplying to the motor a current of electricity, and producing by magnetic induction in the circuit between the source of supply and the motor, a variable magnetically-induced counter electromotive force independently of that of the motor, substantially as set forth.

2. The method of controlling electric motors which consists in supplying to the motor a current of electricity, and producing by magnetic induction in the circuit between the source of supply and the motor a variable magnetically-induced counter electromotive force independently of that of the motor and opposing the current from the source of supply, substantially as set forth.

3. The herein-described method of regulating an electric motor, which consists in inductively developing exterior thereto and in the circuit thereof a counter electromotive force opposing the main current, varying such counter electromotive force to thereby vary the quantity of the main current supplied to the motor, generating a current by the expenditure of energy required for the development of said counter electromotive force and supplying such current to the motor.

4. The method of varying the speed of an electric motor, which consists in placing in series with its armature the armature of a dynamo-electric machine generating by dynamic induction in the armature of said dynamo-electric machine a counter electromotive force and varying the counter electromotive force so generated, substantially as set forth.

5. The method of varying the electromotive force at the terminals of a translating device, which consists in developing in series with the translating device by means of a revolving winding an electromotive force between the source of supply and the translating device which is variable at will, substantially as set forth.

6. The method of generating and regulating the supply of electric energy to translating devices, which consists in generating current, passing same into a multiple-arc distribution system and through a source of variable electromotive force, and causing the electromotive force of the variable source to oppose the electromotive force of the source of supply, substantially as set forth.

7. The method of obtaining from a source of electromotive force a different and controllable electromotive force at the terminals of a translating device with a minimum waste of energy, consisting in placing in the path of the current leading to the translating device the armature of a dynamo-electric machine, and operating said machine as a motor to reduce the electromotive force at the terminals of the translating device, substantially as set forth.

In testimony whereof I have hereunto subscribed my name.

GRANVILLE T. WOODS.

Witnesses:
FRANK S. OBER,
EDWARD C. DAVIDSON.